(12) United States Patent
Driver et al.

(10) Patent No.: US 7,312,764 B2
(45) Date of Patent: Dec. 25, 2007

(54) METHODS AND APPARATUS FOR DISPLAYING IMAGES ON MIXED MONITOR DISPLAYS

(75) Inventors: Tushad P. Driver, Schaumburg, IL (US); Muthu V. Muthuraj, Kenosha, WI (US); Neil D. D'Souza, Mt. Prospect, IL (US); Richard W. I. Yarger, Berkeley, IL (US)

(73) Assignee: The General Electric Company NY (US)

( * ) Notice: Subject to any disclaimer, the term of this patent is extended or adjusted under 35 U.S.C. 154(b) by 598 days.

(21) Appl. No.: 10/672,938

(22) Filed: Sep. 26, 2003

(65) Prior Publication Data
US 2005/0068252 A1 Mar. 31, 2005

(51) Int. Cl.
*G09G 5/14* (2006.01)

(52) U.S. Cl. .......................... 345/1.1; 345/698; 345/3.1

(58) Field of Classification Search ...................... None
See application file for complete search history.

(56) References Cited

U.S. PATENT DOCUMENTS

| 5,923,307 | A  | * | 7/1999  | Hogle, IV ....................... 345/4 |
| 6,573,913 | B1 | * | 6/2003  | Butler et al. ................. 715/761 |
| 6,643,124 | B1 | * | 11/2003 | Wilk ........................... 361/681 |
| 6,839,061 | B1 | * | 1/2005  | Kamakura et al. ........... 345/520 |
| 6,847,335 | B1 | * | 1/2005  | Chang et al. ................. 345/3.1 |
| 6,859,219 | B1 | * | 2/2005  | Sall ............................ 345/1.1 |
| 6,917,362 | B2 | * | 7/2005  | Pinedo et al. ............... 345/530 |
| 6,982,682 | B1 | * | 1/2006  | Kaulgud et al. ............. 345/1.1 |
| 2002/0039084 | A1 | * | 4/2002  | Yamaguchi .................. 345/1.1 |
| 2002/0140625 | A1 | * | 10/2002 | Kidney et al. ............... 345/1.1 |
| 2004/0125044 | A1 | * | 7/2004  | Suzuki ........................ 345/1.1 |
| 2006/0038741 | A1 | * | 2/2006  | Mori et al. .................. 345/1.1 |

* cited by examiner

*Primary Examiner*—Mark Zimmerman
*Assistant Examiner*—David Chu
(74) *Attorney, Agent, or Firm*—Andrus, Sceales, Starke & Sawall, LLP (57) ABSTRACT

A method relates to operating a system using a mixed monitor workstation, such as a medical PACS workstation, having a first display of a first resolution and a second display having a different resolution. The method may include moving a graphical element displayed on the first display to the second display, and rescaling the graphical element when moved such that the graphical element has a different pixel size on the second display than it did on the first. The method may also include allocating a graphical element to the first display or the second display based on characteristics of the graphical element. Various criteria may be used to allocate the graphical element; for instance, whether color images are currently being displayed on a low resolution monitor, whether a graphical element is a high or low resolution image, and others. The method may be implemented using software associated with the workstation.

10 Claims, 7 Drawing Sheets

FIGURE 7

METHODS AND APPARATUS FOR DISPLAYING IMAGES ON MIXED MONITOR DISPLAYS

BACKGROUND OF THE INVENTION

A user of a picture archival and control system (PACS) workstation may use a high resolution monitor to view a high resolution grayscale image acquired by an imaging device. A user may also desire other functionality in the PACS workstation that does not require high resolution. For instance, a user may need to view a color image (such as US (ultrasound) images, NM (nuclear medicine) images, PET (positron emission tomography) images, etc.) or a hybrid image (such as PET-CT images) acquired by an imaging device. A user may workflow specific application that is not an image (dictation, 3D rendering, etc.) or a non-workflow related application (internet, word processing, e-mail, etc.).

To meet these needs, a site typically purchases and configures workstations, separate from the work stations connected to high resolution monitors, with low resolution monitors. These low resolution workstations may be useful for meeting the additional requirements, but are less useful for the viewing of high resolution grayscale images such as x-ray images. Thus, a workstation that can accommodate both high resolution and low resolution monitors in the same workstation would be preferable.

On a multiple monitor system in which all monitors are configured to a single resolution, all components and fonts painted on the screen appear uniform in size and scale. On a mixed monitor system, a system with both high resolution and low resolution images, the resolution of all monitors may be different. This is particularly true in PACS medical imaging applications, which require high-resolution grayscale monitors to display images of diagnostic quality. While such monitors are ideal for diagnostic purposes, they are not very suitable for other non-diagnostic and general purposes.

In such cases, on-screen components and fonts that are scaled correctly for the high-resolution monitors will look huge and blown up on the low-resolution monitors. This is due to the DPI (Dots Per Inch) count on each monitor. The high-resolution monitors have a much higher DPI than the low resolution monitors. Hence, any component or font that has been specified to be, say 10 pixels (dots) wide and 10 pixels high, will appear smaller on the high-resolution monitors, but much larger on the low-resolution monitors. Thus, it would be preferable to have a system that adjusts the image size so that it is appropriate for the monitor on which it is displayed.

Also, a lot of different types of data may be viewed on an image workstation that has monitors of different resolutions. Some data may be more appropriate to a particular type of monitor than another type of data. A control program for a work station would preferably use the display areas on the monitors as efficiently as possible. It would be preferable to have a system that could display data on a monitor type that is most appropriate for that data.

The teachings hereinbelow extend to those embodiments which fall within the scope of the appended claims, regardless of whether they accomplish one or more of the above-mentioned needs or preferences.

SUMMARY OF THE INVENTION

One embodiment relates to a method for operating a system using a mixed monitor display having a first display of a first resolution and a second display of a second resolution different than the first resolution. The method comprises moving a graphical element displayed on the first display to be displayed on the second display; and scaling the graphical element on the second display such that the image has a different pixel size on the second display than it did on the first display.

Another embodiment provides a method for controlling a mixed monitor display having a first display of a low resolution and a second display of a high resolution. The method comprises obtaining a graphical element to display, and allocating the graphical element to the first display or the second display.

An additional embodiment is directed to a method for operating a workstation adapted to be connected to a high resolution monitor and a low resolution monitor. The method comprises displaying a first graphical element on a high resolution monitor connected to the workstation at a time. The first graphical element is configured for high resolution display. The method also comprises displaying a second graphical element on a low resolution monitor connected to the workstation at the time. The second graphical element is configured for low resolutions.

Another embodiment relates to a local image display system of a medical imaging system. The system comprises a workstation; a high resolution monitor connected to the workstation; and a low resolution monitor connected to the workstation. The work station comprises a processing circuit configured to simultaneously display graphical elements scaled to a high resolution on a high resolution display and graphical elements scaled to a low resolution on a low resolution display.

An additional embodiment provides a software program for a medical imaging workstation. The software program comprises an allocation protocol that may be used to move a graphical element from being displayed on a first display with a first resolution to being displayed on a second display with a second resolution that is different than the first resolution; and a data scaling portion that dynamically scales a moved graphical element.

The above mentioned embodiments are particularly useful for viewing medical images and running other typical healthcare applications.

The above mentioned methods may be implemented by a processing circuit of a workstation and may be implemented using a software program running on a microprocessor or other digital circuit of the workstation.

Other principle features and advantages of the invention will become apparent to those skilled in the art upon review of the following drawings, the detailed description, and the appended claims.

DETAILED DESCRIPTION OF THE PREFERRED EMBODIMENTS

Graphical element refers to the visible form of any information or data being displayed on a display, such as on a monitor. Image refers to any image captured by an imaging device (for instance an x-ray image, a PET image, etc.). Moving refers to moving in real-time; not storing and then later (i.e. several minutes later) opening the data on a different workstation. Transferring refers to transferring a graphical element from one display to another display in any amount of time and could include moving. Moving could include dragging, where a user latches on to a graphical element, moves the element or a representation of the element across one or more screens, and then unlatches the graphical element (typically accomplished now by pressing a mouse buttons to latch, moving by moving the mouse, and,unlatching when the mouse button is released). Moving could, in some circumstances, also include copying a graphical element and then pasting the graphical element (often by copying the graphical element to a "clipboard" and then pasting the graphical element from the "clipboard").

Figure 1:
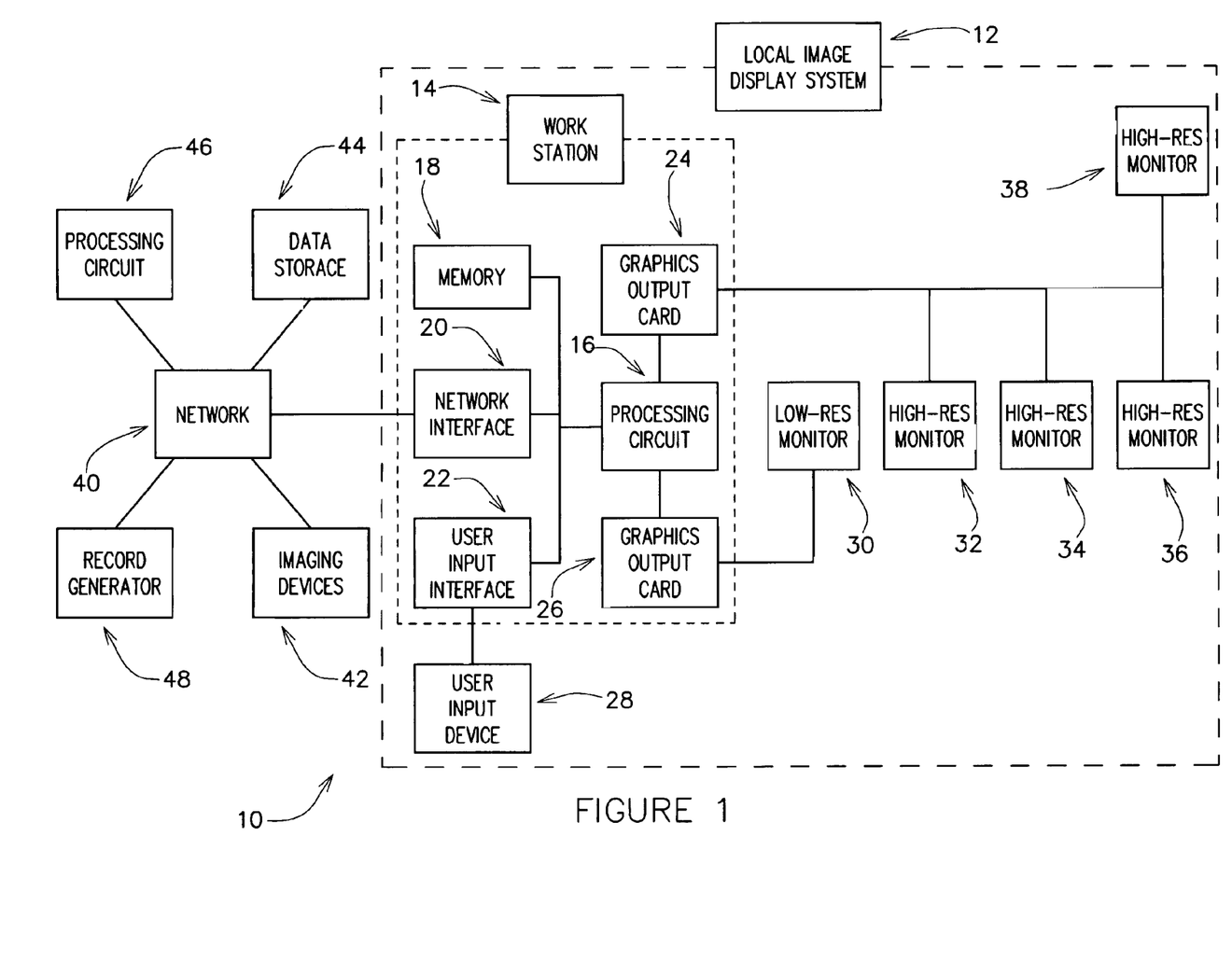
FIG. 1 is a schematic diagram of an image viewing system according to one embodiment.

Referring to FIG. 1, an imaging system 10 includes a local image display system 12 coupled to a network 40. Imaging system 10 may be a medical picture archiving and control system (PACS) that is used with various medical imaging devices. Local image display system 12 includes a work station 14. A work station may be a personal computing device, or some other device. The work station includes a processing circuit 16 configured to process the various data and perform the various functions of work station 14. Processing circuit 16 may include various types of processing circuitry, digital and/or analog, and may include a microprocessor, microcontroller, application-specific integrated circuit (ASIC), or other circuitry configured to perform various input/output, control, analysis, and other functions to be described herein.

Work station 14 includes a memory 18. Memory 18 may include one or more non-volatile memory devices and/or a volatile memory. Memory 18 may also include an drive that receives a removable data storage medium. Currently, memory 18 may include a hard drive, RAM, and a disk drive (such as a floppy disk drive, a CD drive, a DVD drive, an SD card drive, etc.).

Memory 18 may store various images to be displayed by work station 14. Memory 18 may store non-image display applications (e-mail, word processing, spreadsheet, database, patient monitoring, billing, and other applications).

Work station 14 also includes a network interface 20 that is used to couple work station 14 to a network 40. Data is transferred between network 40 and work station 14 using network interface 20. Network interface 20 may be a modem card, an Ethernet card, a wireless network card, or some other interface.

Work station 14 also includes a user input interface 22 which allows work station 14 to receive user inputs from a user input device 28. User input device 28 may include one or more of a keyboard, a keypad, a mouse, a wireless device, a touch-screen, a microphone that detects voice commands, and other user input devices.

Work station 14 also includes a how resolution (low-res) graphic output card 26 that facilitates the flow of data between work station 14 and a low resolution monitor 30. Low resolution monitor 30 is generally a color monitor and may be a type C monitor. Work station 14 also includes a high resolution (high-res) graphic output card 24 that facilitates the flow of data between work station 14 and a plurality of high resolution monitors 32-38. Typically, a high resolution graphic output card 24 supports outputting data to two high resolution monitors 32-34 per card that is in a communication slot on workstation 14. Reference to a high resolution graphics card in this application is a reference to one or more cards that support high resolution monitors, unless stated otherwise herein. High resolution monitors 32-38 may be high resolution grayscale monitors. High resolution grayscale monitors 32-38 may generally be type A+ (generally greater than or equal to about 168 DPI), type A (generally greater than or equal to about 144 DPI), type B+ (generally greater than or equal to about 133 DPI), or type B (generally greater than or equal to about 103 DPI). Type B monitors are generally the lowest resolution of the high resolution monitors used in medical applications. Thus, high resolution monitors tend to have a resolution that is at least about 103 DPI in medical applications.

High resolution monitors 32-38 may be a same type of monitor, all different types of monitors, or some combination thereof. High resolution graphic output card 24 contains four output slots. In other embodiments, high resolution graphic output card 24 may have any number of other slots. The most common number of slots for current high resolution graphic output cards is two or four. Monitors 30-38 may be physically connected, to workstation 14, or may only be functionally connected to (controlled by) workstation 14—such as using a wireless connection.

Processing circuit 16 is configured to operate low resolution monitor 30 at a same time as one or more of the high resolution monitors 32-38. Low resolution monitor 30 is operated at low resolution and high-resolution monitors 32-38 are operated at a high resolution. In the past, medical work stations were not capable of this functionality since the operating software was unable to operate monitors at different resolutions. Processing circuit 16 may be comprised of a microprocessor running a software program. The software program that controls display output may be programmed in a JAVA programming language to run in a Microsoft Windows-based operating system environment.

Low resolution monitor 30 and high resolution monitors 32-38 may be treated as a single extended display by processing circuit 16. For instance, a processing circuit configured in this manner may allow a user to continuously move a cursor from the left side of monitor 30 to the right side of monitor 38. As disclosed below, processing circuit 16 may be configured such that movement from low resolution monitor 30 through to high resolution monitor 38 is as transparent as possible for a user. The area treated as if it were a single display shall be referred to as a display area. Thus, a display area may have multiple displays 30-38 which combine to operate as if they were a single display.

Imaging system 10 also includes one or more imaging devices 42 coupled to a network 40. Images 52, 54 captured by imaging devices 42 can be transferred across network 40 to viewed on monitors 30-38. Examples of imaging devices that may be used in a medical environment include CR (x-ray) devices, XA (angiography) devices, MM (mammography) devices, US devices, PET devices, CT (computed tomography) devices, MR devices, other x-ray and nuclear medicine imaging devices, etc. The color images are believed to currently be limited to low resolution monitors 30 and the grayscale images tend to be better viewed on high resolution monitors 32-38.

Imaging system 10 also includes a data storage system 44 that stores various information. Data storage system 44 may include one or more data storage devices such as hard drives, tape drives, and other storage devices. Some examples of information that may be stored includes images 52, 54 obtained from an imaging device 42, patient record information, e-mail information, and other information. Imaging system 10 may also include a record generator 48, record generator 48 may generate various records based on use of imaging system 10. For instance, a billing record may be made, an entry may be made in a patient record, or other records may be kept.

Imaging system also contains a second processing circuit 46. Processing circuit 46 may process various image data, or may perform those functions listed above relating to processing circuit 16, remotely processing data and commands for work station 14.

Network 40 may be a local area network, a wide area network, an intranet, an internet, a combination of these networks, or some other type of network. Network 40 may be wired, may be wireless, or may have some combination of wired and wireless connections.

Figure 2:
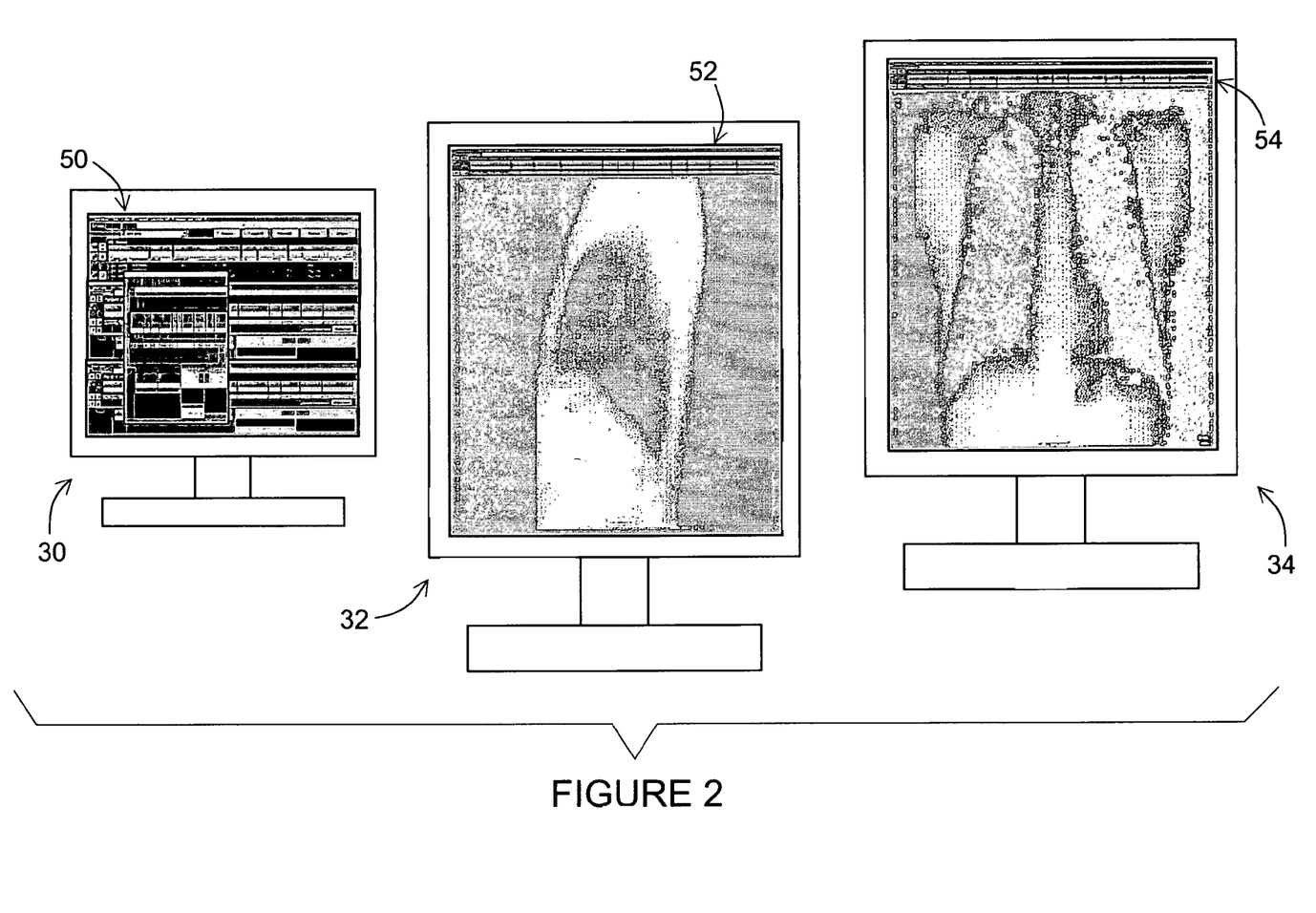
FIG. 2 is a depiction of a multiple monitor system according to another embodiment.

Referring to FIG. 2, a local image display system 12 (FIG. 1) includes a low resolution monitor 30 that has non-image application data, low resolution data 50, being displayed. Examples of typical non-image applications include an internet browser, a patient record application, an application for listing image files, an e-mail application, a database application, . . .

Local image system 12 also includes two high resolution monitors 32, 34 that display high resolution gray-scale images 52, 54, in this case two x-ray images.

Local imaging system 12 is able to display both high resolution images 52, 54 and low resolution data 50 at a same time using a single workstation. In this embodiment, low resolution monitor 30 would be a type C color monitor (generally about 90 DPI) and high resolution monitors 32, 34 would be type B, B+, A, or A+.

Figure 3:
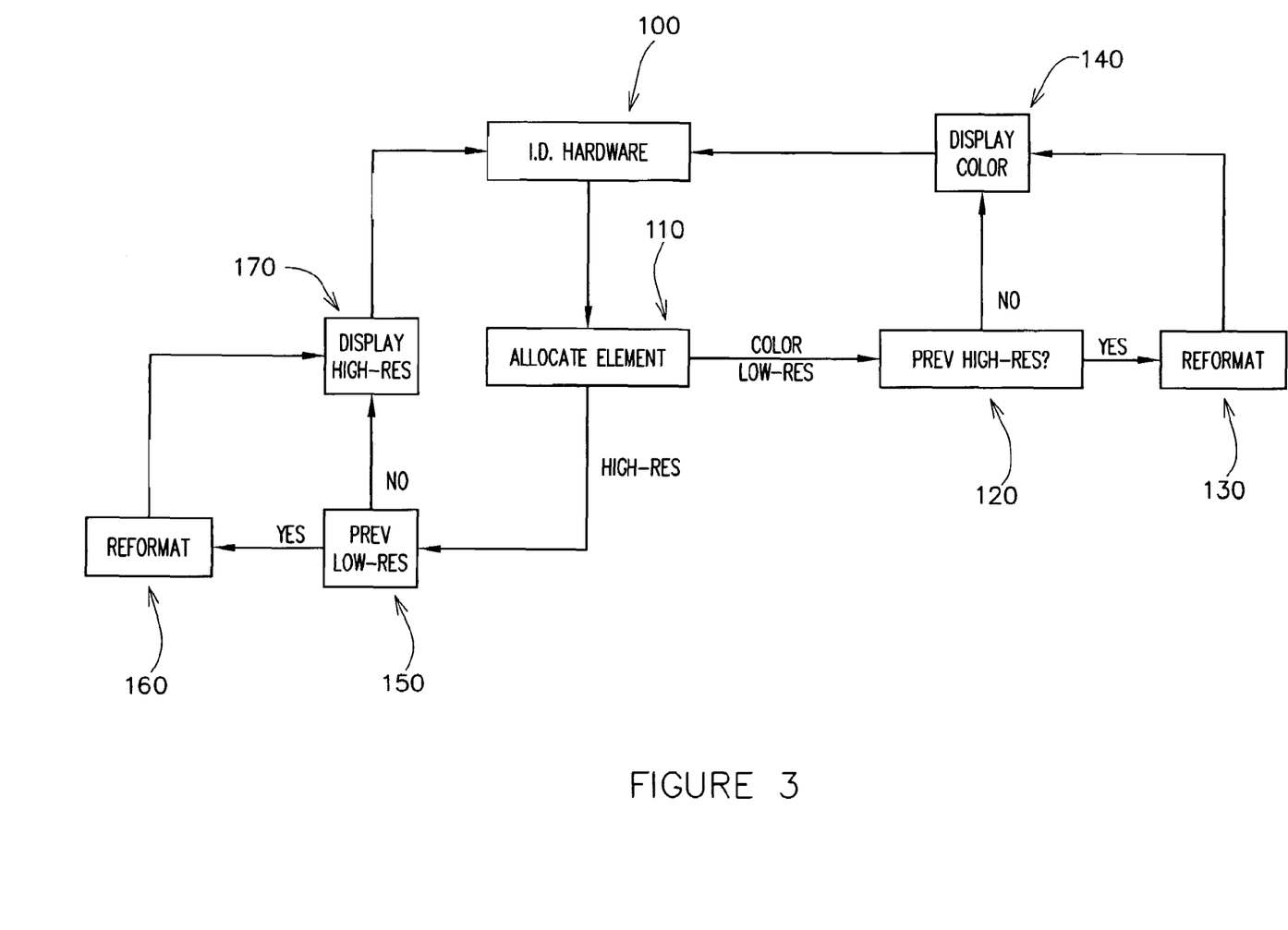
FIG. 3 is a flowchart of a method for operating a mixed monitor system according to another embodiment, which method may be implemented by a software program run on a workstation.

Referring to FIG. 3, a method for operating a mixed monitor display includes identifying the type of hardware connected at block 100. This may include identifying the resolution and/or types of monitors connected. The hardware may be identified every time through the process, may only be identified only when the program first starts, or may depend on some other criteria.

A determination is then made at block 110 regarding where to display graphical elements to be displayed. This may include determining which monitor should display the graphical element.

If a low resolution monitor 30 will display the graphical element, then a determination is made at block 120 whether the graphical element is in a high resolution form. If so, the graphical element is reformatted to a low resolution form at block 130 and the element is displayed on a low resolution monitor 30 at block 140.

If a high resolution monitor 32 will display the graphical element, then a determination is made at block 150 whether the graphical element is in a low resolution form. If so, the graphical element is reformatted to a high resolution form at block 160 and the element is displayed on a high resolution monitor 32 at block 170. An graphical element may be displayed on one or more high resolution monitors. Any number of criteria could be used to determine which and how many monitors on which to display the image. An image's size may dictate the number of monitors needed to display the image. The number of open images may affect how many monitors are available. A determination may be made if images are related. An image may be from a same set of images taken during a same examination, a set of images may relate to a same problem, a set of images may relate to a same patient, or some other criteria may be used to determine if images are related. Related images may be displayed on different monitors. Alternatively, if no other monitor is displaying a related image, the new image may be displayed on more monitors. Also, a user may choose which and/or set criteria to use to determine which monitor on which to display the graphical element.

Reformatting at blocks 130 and 160 may include resealing the graphical element. The need for dynamic scaling arises in systems having display areas having monitors of different resolutions where a graphical element may be transferred from one to the other. In one embodiment of a software program for a workstation, a program is implemented in which all the fonts and components scale dynamically according to the monitor they are displayed on. Before each component or font is painted or drawn on the screen, the system is able to determine where the component needs to appear. The absolute coordinates may be mapped into a virtual application area. A virtual application area is the area defined by the software that sets the screen bounds in which the application is run. This allows the software to restrict itself to running in specific screen areas. For example, on a four monitor system, a workstation can be configured to use only two monitors (say the second and the third) to display images (leaving the first and fourth monitor for other uses). As far as the software is concerned, there are only two display monitors, not four, and thus configures its virtual application display area to map to the co-ordinates of those two monitors.

By mapping these absolute co-ordinates into a virtual applications area and by knowing the resolution of the various monitors, a scaling interface can provide each such font and component a unique scaling factor, which it then uses to rescale its size optimally for the monitor on which it is to be displayed. This happens consistently during the application execution, every time a component is created at a particular point on the screen, and every time a component is shifted to another location on a monitor with a different resolution (i.e. the element has a normal resolution, but is being displayed on a monitor with a resolution that is different than the element's normal resolution).

This significantly enhances the usability of the application on mixed monitor systems, making every component and font appear uniform across the application. In this manner, a system may be set to operate such that the user does not perceive a difference in screen resolutions with regard to elements transferred from one display's screen to a different display's screen.

Figure 4:
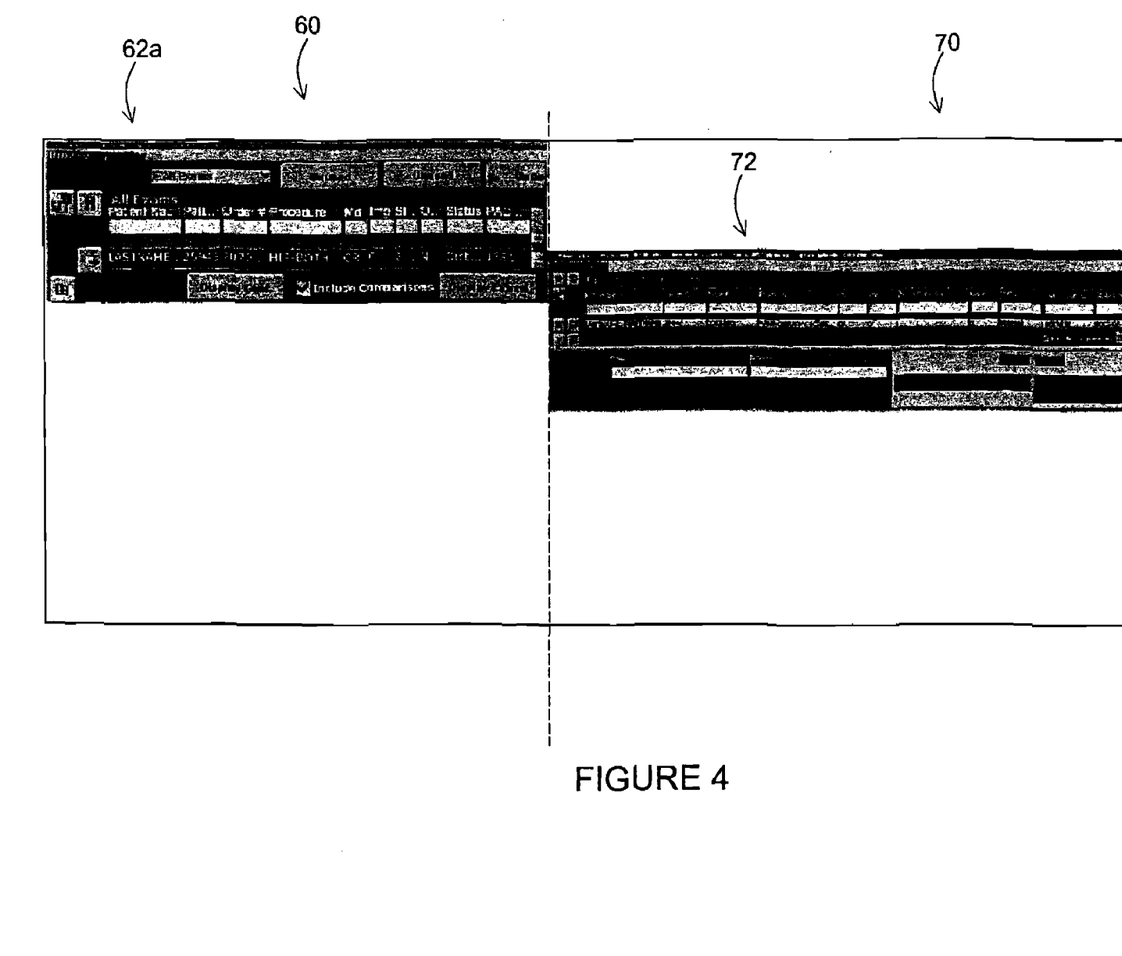
FIG. 4 is a pair of screen shots from a workstation using monitors of different resolutions where the images are not scaled.
Figure 5:
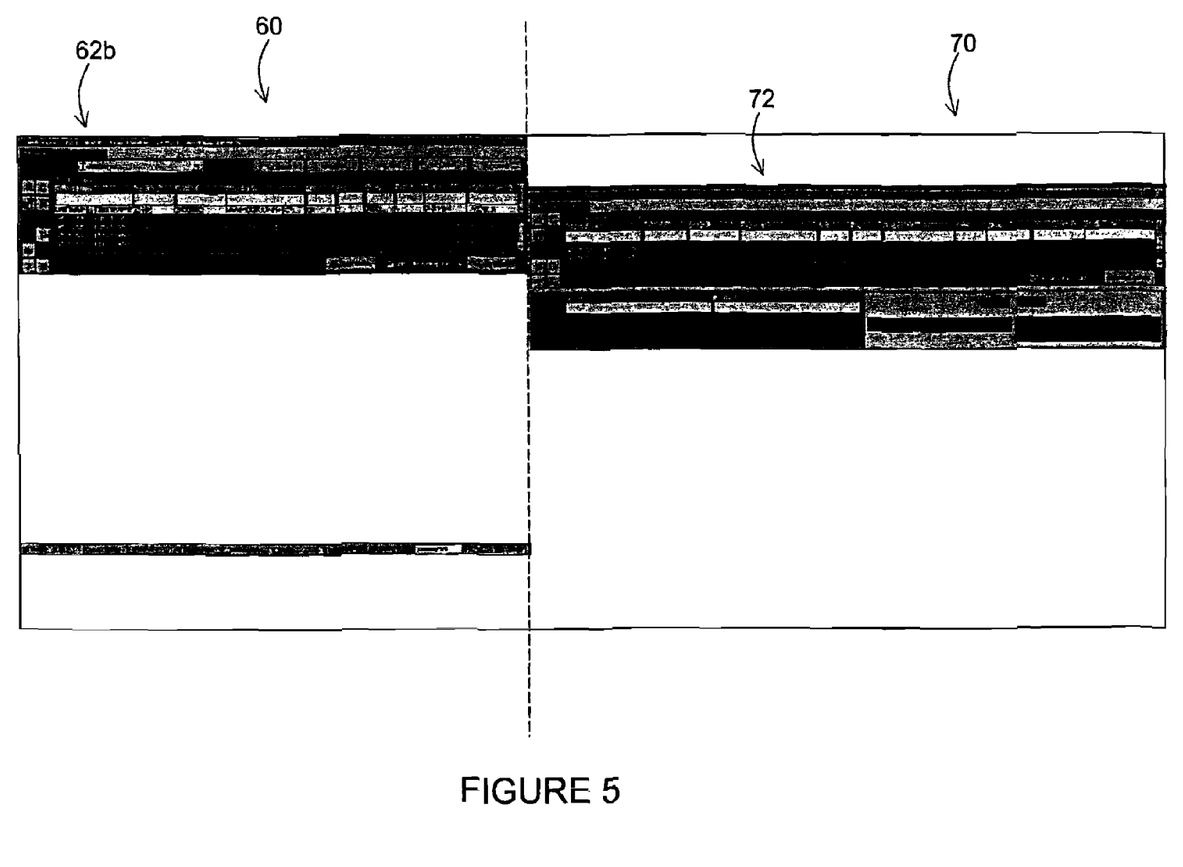
FIG. 5 is a pair of screen shots from a workstation using monitors of different resolutions where the images are scaled.

Referring to FIGS. 4 and 5, a difference can be seen in the screenshots of two workstation palettes 60, 70 running on a mixed monitor system, where one incorporates resealing and the other does not incorporate resealing. The palette 60 on the left is displayed on a low-resolution monitor 30 of standard DPI 72, while the palette 70 on the right is displayed on a high-resolution monitor 32 of DPI 144.

FIG. 4 (mix-unscaled graphical element) shows a screenshot of the two palettes 60, 70 on a mixed monitor system without the resealing for mixed monitor implementation. The size of the fonts and components of the graphical elements 62a, 72 on the two monitors is vastly different.

FIG. 5 (mix-scaled graphical element) is a screenshot of the palettes of FIG. 4 with resealing. The graphical element 74b being displayed on the low resolution monitor 30 has been rescaled to reflect the lower resolution. With the scaling thus implemented, all components and fonts of the graphical element 74b have been scaled so the user does not perceive the difference between the graphical elements 62b, 72 of the two palates 60, 70 despite the vast difference in DPI still existing between the two monitors 30, 32. This resealing preferably occurs dynamically such that a user is less likely to notice a difference in the graphical element being moved from high resolution monitor 32 to low resolution monitor 30.

Figure 6:
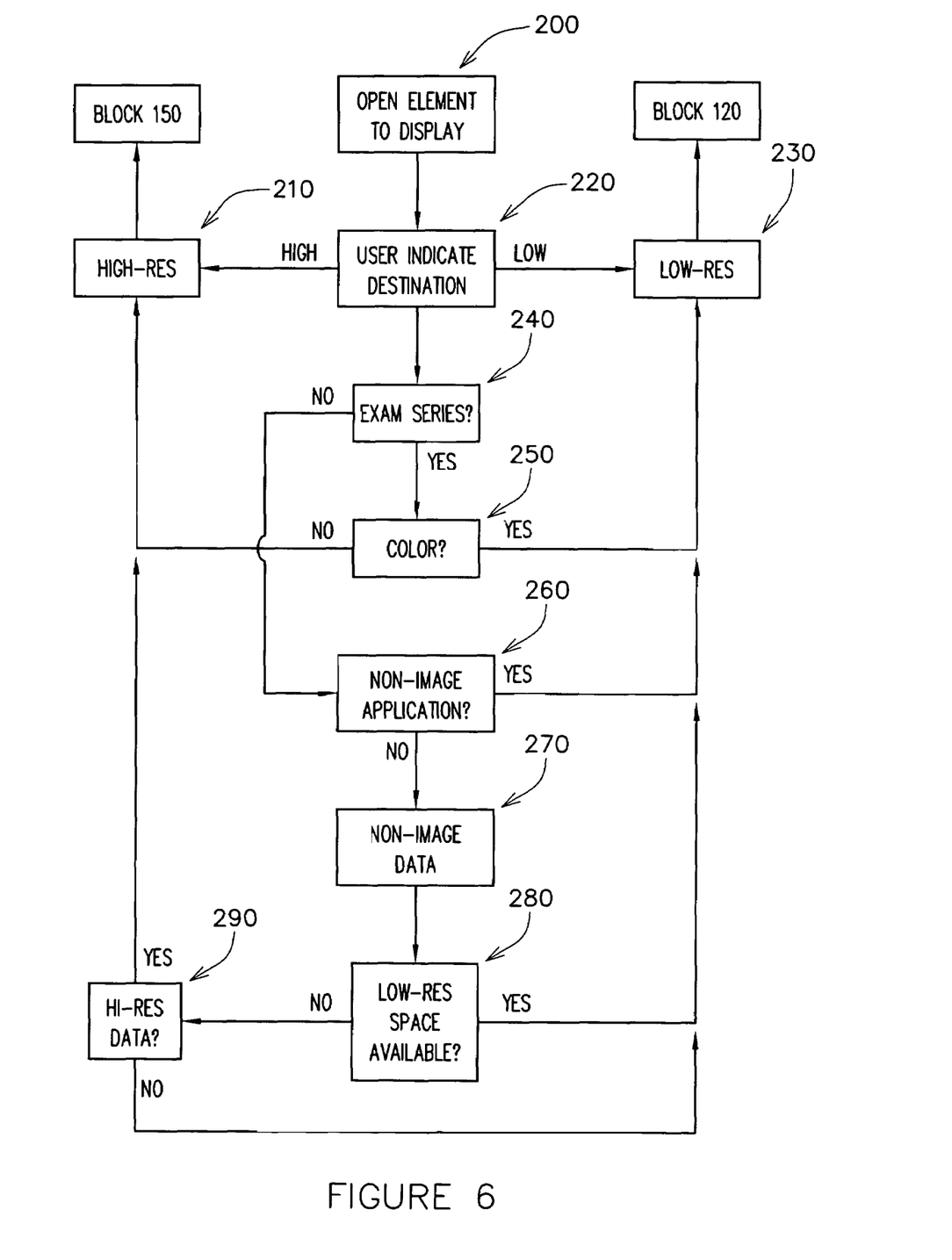
FIG. 6 is a flowchart of a method for distributing graphical elements to be displayed by a system having monitors of different resolutions, which method may be implemented by a software program run on a workstation.

Referring to FIG. 6, allocating an element at block 110 may include obtaining a graphical element to display at block 200. Obtaining a graphical element to display could include generating a new element based on a user command or as a result of system operation, could include moving a graphical element from one monitor to another monitor, or may include other means of obtaining an image.

Once the image is obtained, a determination is made at block 220 whether the system has received a user input indicating a desired destination. Some examples of this may include an operator setting the system to open a particular type of file in a particular monitor, may include a user indicating that an image on one monitor should be displayed on a different monitor (for instance, by dragging the element from one screen to another), or may include some other means. If a user has indicated a monitor on which to display the graphical element, the graphical element is displayed on that monitor at block 210 for a high resolution image or at block 230 for a low resolution image.

If a user had not indicated a destination at block 220, a new graphical element may be delivered to a particular display. Delivering a graphical element occurs where a user does not indicate, at the time the image is to be displayed, a location to display the image.

In this embodiment, delivering an image is a multi-part process. First, a determination is made at block 240 whether the graphical element is an image obtained by an imaging device 42. If so, a determination is made at block 250 as to whether the graphical element is a color image. If it is a color image, the image is displayed on the low resolution monitor 30 at block 230. If the image is not a color image, the image is displayed on the high resolution monitor at block 210.

The inclusion of blocks 240 and 250 are particularly useful for inclusion in a software portion which facilitates the display of stack synch's, most notably those where some images are best suited for viewing in color and others are best suited for viewing as high resolution images (for example a Positron Emission Tomography (PET) set with a Computed Tomography (CT) set).

A stack synch is generally used for a volumetric set of images that, when viewed in sequence, give a better understanding of a subject of interest. Using a stack synch, a user may sequentially view a number of slices of the subject. Stacks of images from different exams occurring on different days may be compared to help identify the state of a structure identifiable in the set (for instance, a growth of a toomer).

When using both PET and CT images (and potentially a plurality of related sets of images from exams taken at different times—generally two or more sets of CT images with a set of PET images), a program may be set such that the images may be displayed on separate monitors and such that corresponding slices from each imaging device may be viewed simultaneously. If a PET and CT sets were viewed on high resolution grayscale monitors only, a clinician would tend to lose the advantages associated with the colors of the PET images. If such a set were alternately viewed on low resolution color monitors only, a clinician would tend to lose the resolution found in the CT monitors. If the images were viewed on a workstation that only supported one resolution size, the CT images would generally tend to appear too large or the PET images would generally appear too small.

By using a mixed monitor system and by setting a system such that the images are automatically delivered to the appropriate monitor, stack synch display programs may be programmed to function in a more efficient manner. For instance, images may be set to automatically be delivered to a display that is optimally suited for the display of that image, and the images would appear a generally appropriate size.

If the graphical element is not an image obtained by an imaging device at block 240, a determination is made at block 260 whether the graphical element is a non-image application. If the graphical element is a non-image application then the graphical element is displayed on a low resolution monitor 30 at block 230.

If the graphical element is part of an image related application at block 260, but is not image data at block 240 the data at block 270 belongs to an application related to the display of images (such as an image filing system, a date or patient record corresponding to the image, etc.), but is not the image itself.

For non-image data of block 270, a determination is made at block 280 as to whether space is available on the low resolution monitor 30. Space being available may include any number of criteria. For instance it could include determining at block 280 whether a color image obtained by an imaging device 42 is currently being viewed on the low resolution monitor 30. Alternatively, the number of items being displayed on the low resolution monitor 30 could be determined. Also, other criteria and/or a weighing of multiple criteria may be used at block 280 to determine whether space is available. If space is available at block 280, the data is displayed at block 230 on the low-resolution monitor.

If space is not available at block 280, a determination is made at block 290 as to whether the data is ordinarily displayed in high resolution. If so, the data is displayed on a high-resolution monitor at block 210. If not, the data is displayed on a low-resolution monitor at block 230.

The methods of FIGS. 3 and 6 may be implemented by a software program. The software program may be run in a processing circuit 16, which includes a microprocessor, that is part of a workstation 14.

Figure 7:
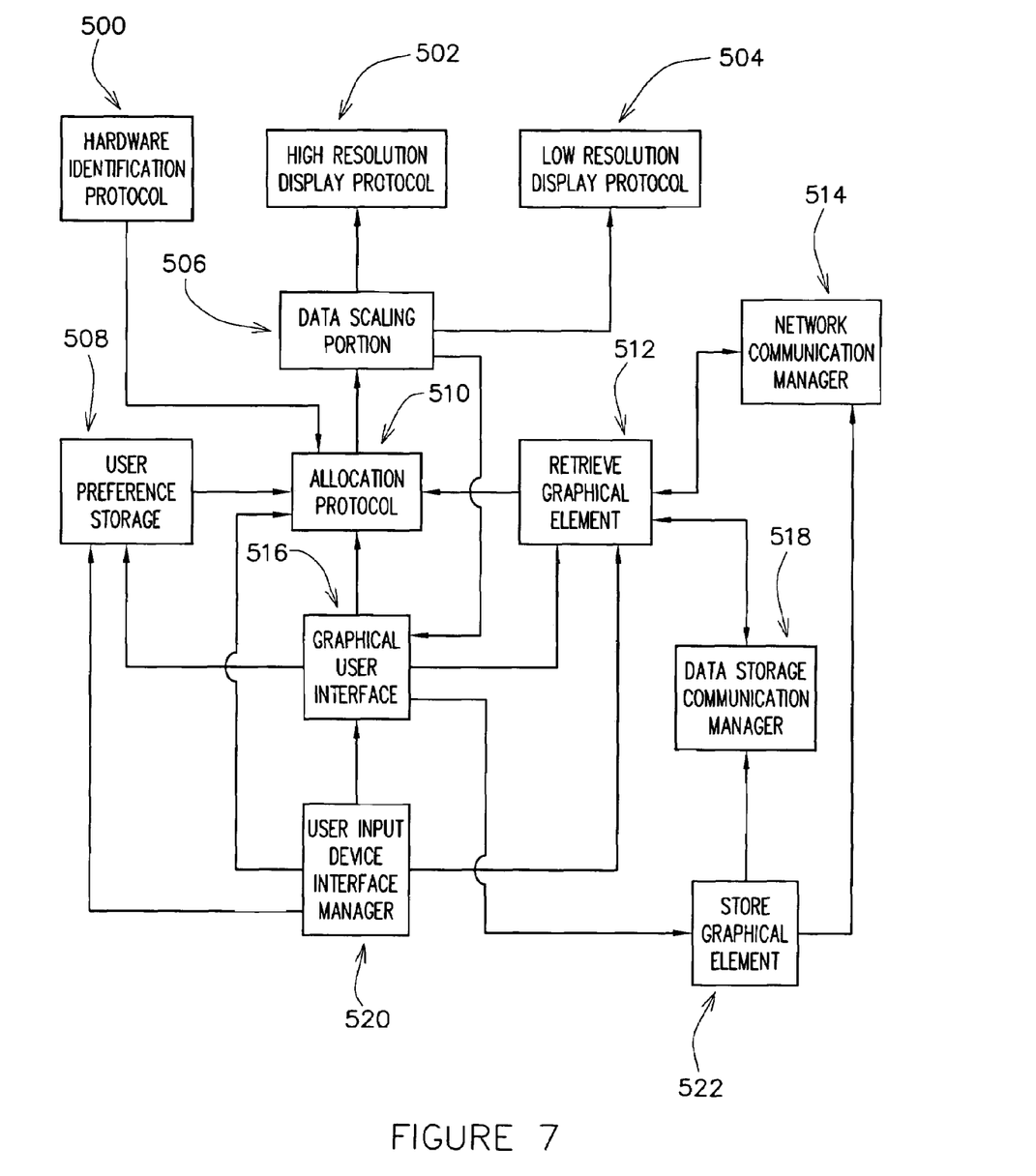
FIG. 7 is a schematic diagram of a software program for use with a mixed monitor workstations

Referring to FIG. 7, a software program for a multi-monitor display includes an allocation protocol 510 that allocates where a graphical element is to be displayed. Allocation protocol 510 may operate in a manner similar to that shown in FIG. 6.

Once a graphical element is to be allocated, it is transferred to data scaling portion 506, corresponding to blocks 120, 130, 150 and 160 (FIG. 3). Scaling the data typically comprises adjusting the number of pixels used to render the portions of the graphical element. The data may be scaled by data scaling portion 506 or may be sent as is to the appropriate monitor 30-38. Graphical elements to be displayed on a high resolution monitor are governed by high resolution display protocol 502 that controls communication of data to and from high resolution displays 32-28. Graphical elements to be displayed on a low resolution monitor are governed by low resolution display protocol 502 that controls communication of data to and from low resolution displays 30, such as current color (type C) displays.

Information regarding where graphical elements are located is stored by graphical user interface information portion 516. Graphical user interface information portion 516 receives information from data scaling portion 506 regarding the location and scale of various graphical elements on the various monitors. This allows the system to interpret user inputs, where the user inputs are based on buttons or other information (such as dragging a window or other element) being displayed on a display 30-38. A user input from a user input device 28 is interpreted by user input device interface manager 520. The interpreted user input is then compared with the graphical user interface stored by the graphical user interface information portion 516 to determine whether a user has inputted a command to take some action.

If the comparison at the graphical user interface information portion determines that a user has inputted a command to take some action, this information is sent to allocation protocol 510 if data being displayed or already open is being moved.

If the comparison at graphical user interface information portion 516 determines that a user has inputted a command to take some action, this information is sent to graphical element retrieval portion 512 if a graphical element, such as an image, needs to be loaded from a data storage device. Graphical element retrieval portion 512 uses data storage communication manager 518 to retrieve data from a local data storage device 18 (such as a work station 14 hard drive, disk drive, etc.). Graphical element retrieval portion 512 uses network communication manager 514 to retrieve data from a networked data storage device 44; retrieved graphical elements are then allocated by allocation protocol 510.

If the comparison at graphical user interface information portion 516 determines that a user has inputted a command to take some action, this information is sent to graphical element storage portion 522 if a graphical element, such as an image, needs to be saved to a data storage device. Graphical element storage portion 522 uses data storage communication manager 518 to store data to a local data storage device 18. Graphical element storage portion 522 uses network communication manager 514 to store data to a networked data storage device 44. Storing an element may affect the display of information, in which case data would also be sent to allocation protocol 510 to reallocate the currently open graphical elements to be displayed.

If the comparison at graphical user interface information portion 516 determines that a user has inputted a command to take some action, this information is sent to user preference storage portion 508 if a user is using the graphical interface to input customize the operation of the software. Some examples of customization that may be possible include altering the allocation protocol. This may include, turning some of the decisions on or off (for instance, may include skipping one or more of the blocks of FIG. 6). Other preferences may include selecting which monitor or group of monitors on which a user wants to display the application, customizing the resolution or the DPI for each monitor individually if a user does not want to use the standard system-default DPI, splitting a single monitor into two or more monitors by configuring the virtual application display area, so even a single monitor may be used to display images in the same layouts as multiple monitors.

If a user input indicates that some action should be taken, but the input is not based on the graphical user interface, data relating to the input may be handled directly by allocation protocol 510, graphical element retrieval portion 512, and/or graphical element storage portion 522.

The software program may also include a hardware identification protocol that identifies the types of displays functionally connected to a workstation 14. Allocation protocol 510 may then allocate graphical elements differently based on the number and types of displays functionally connected to the workstation.

This embodiment of the software may also contain other software elements not related to the displaying of information, which elements may relate to the functionality of workstation 14.

Referring again to FIG. 1, high resolution monitors 32-38 used for medical applications tend to have a few unique features. For instance, the high resolution monitors 32-38 tend to have significantly more rows of pixels vertically than horizontally. Typical low resolution monitors tend to have approximately 1,280 pixels horizontally and 1,024 pixels vertically. High resolution monitors have more pixels than low resolution monitors, and typically have anything upwards of about 1,500 pixels horizontally and about 2,000 pixels vertically, although other depths are possible. A type B monitor would generally have a pixel depth of about 1,200 pixels horizontally and about pixels 1,600 vertically. A type B+ monitor would typically have a pixel depth of about 1,536 pixels horizontally and about 2,000 pixels vertically. Type A and A+ would have even larger pixel depths.

High resolution monitors also tend to have a greater DPI than low resolution monitors. A typical low resolution monitor has a DPI of about 90, and high resolution monitors tend to have a DPI greater than 90, generally in the range of about 90 to about 180. More suitable high resolution monitors tend to have DPI values of at least about 133.

A high resolution monitor is generally defined as a monitor that has a DPI value that is greater than that of a low resolution monitor which has a standard DPI of 90.

High resolution monitors 32-38 for medical images are currently only in grayscale, and generally have a large number of potential shades of gray. The intensity of each pixel is also typically fairly high.

Typical types of medical images to be displayed include x-ray images, CT images, PET images, MR, US, CR, XA, MM, and other x-ray and nuclear medicine images.

The invention has been described with reference to various specific and illustrative embodiments and techniques. However, it should be understood that many variations and modifications may be made while remaining within the spirit and scope of the invention. For instance, some embodiments show some components as part of a workstation and other components as coupled through a network. This arrangement is not required, and many of these components may be rearranged. Also, the order and types of blocks in FIGS. 3 and 6 may be rearranged and still remain within the scope of one or more of the claims. Also, the interaction of the portions of the software program described with respect to FIG. 7 may be rearranged. Further, still some of the elements shown in FIGS. 1-3, 6, and 7 may be excluded, or other elements added, and still remain within the scope of the claims. Also, while separate display interface cards are shown for high resolution monitors and low resolution monitors, a single interface may be used. Also, reference to "a high resolution interface and a low resolution interface" in a claim does not necessarily mean that the interfaces are separate and distinct unless stated otherwise in the claim. Also, many embodiments have been described with respect to medical PACS systems where this type of system is particularly useful and has been developed, but some embodiments may have uses outside the medical field.

What is claimed is:

1. A workstation for a local image display system of a medical imaging system, comprising:
   a processing circuit configured to:
      simultaneously display graphical elements of medical images scaled to a high resolution on a high resolution display and graphical elements scaled to a low resolution on a low resolution display; and
      rescale graphical elements moved between the high resolution display and the low resolution display; and
   a high resolution monitor output connected to the processing circuit; and
   a low resolution monitor output connected to the processing circuit;
   wherein the processing circuit is configured to allocate all non-medical image data to allow resolution color display if no color medical images are being displayed on the low resolution color display.

2. A workstation for a local image display system of a medical imaging system, comprising:
   a processing circuit configured to:
      obtain a stack synch of medical images comprising graphical elements;
      allocate the medical images in the stack synch for simultaneous display on a high resolution display and a low resolution display, wherein medical images scaled to a high resolution are displayed on the high resolution display and medical images scaled to a low resolution are displayed on the low resolution display;
      recognize non-image graphical data associated with the stack synch;
      determine whether display space is available on the low resolution display;
      allocate the non-image graphical data to the low resolution display when space is available on the low resolution display; and
      dynamically rescale and allocate the non-image graphical data to the high resolution display when no space is available on the low resolution display.

3. The workstation of claim 2, wherein no space is available on the low resolution display when a color image from the stack synch is currently displayed on the low resolution display.

4. The workstation of claim 2, wherein no space is available on the low resolution display when a predetermined number of medical images from the stack synch are currently displayed on the low resolution display.

5. A workstation for a local image display system of a medical imaging system, comprising:
   a processing circuit configured to:
      simultaneously display graphical elements of medical images scaled to a high resolution on a high resolution display and graphical elements of medical images scaled to a low resolution on a low resolution display;
      dynamically rescale graphical elements of medical images that are moved between the high resolution display and the low resolution display by
         determining where the moved graphical elements are to appear on at least one of the high and low resolution displays,
         defining a virtual application area for the moved graphical elements, the virtual application area setting display bounds in which a rescaling application is to run;
         mapping absolute coordinates for the virtual application area;
         providing each graphical element with a unique scaling factor; and
         dynamically rescaling the size of each graphical element based on the unique scaling factor; and
         running the application to display each rescaled graphical element on the at least one of the high and low resolution displays and allocating all non-medical-image data to allow resolution color display if no color medical images are being displayed on the low resolution color display.

6. The workstation of claim 5, wherein the graphical elements are rescaled based on the unique scaling factor to change a number of pixels used to display the graphical element.

7. The workstation of claim 5, wherein the processing circuit runs a software component that comprises a hardware identification protocol that is configured to identify a type of display connected to the workstation for which the processing circuit operates, wherein the software components further comprise an allocation protocol that allocates graphical elements to be displayed based on a type of display identified by the hardware identification protocol.

8. The workstation of claim 5, further comprising a network communication manager configured to facilitate transfer of a medical image, acquired by a medical imaging device, from a storage device located on a network.

9. The system of claim 5, wherein the processing circuit is configured to allocate medical images based on a type of monitor for which the medical images are best suited.

10. The system of claim 5, wherein the processing circuit is configured to allocate color medical images in the stack synch to a color display and high resolution images in the stack synch to a high resolution display.

* * * * *